(12) United States Patent
Ono

(10) Patent No.: US 9,071,828 B2
(45) Date of Patent: Jun. 30, 2015

(54) IMAGING APPARATUS

(71) Applicant: FUJIFILM Corporation, Tokyo (JP)

(72) Inventor: Shuji Ono, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/166,341

(22) Filed: Jan. 28, 2014

(65) Prior Publication Data

US 2014/0139645 A1    May 22, 2014

Related U.S. Application Data

(63) Continuation of application No. PCT/JP2012/066355, filed on Jun. 27, 2012.

(30) Foreign Application Priority Data

Jul. 29, 2011    (JP) .................................. 2011-167279

(51) Int. Cl.
*H04N 15/00* (2006.01)
*H04N 13/02* (2006.01)
*H04N 5/225* (2006.01)
(Continued)

(52) U.S. Cl.
CPC ......... *H04N 13/0207* (2013.01); *H04N 5/2254* (2013.01); *H04N 5/23212* (2013.01); *H04N 5/238* (2013.01); *G03B 35/10* (2013.01)

(58) Field of Classification Search
CPC ................ G02B 2027/014; G02B 2027/0118; G02B 2027/0138; G02B 27/0172; G02B 27/0176; G02B 3/14; H04N 5/23212; H04N 5/2254; H04N 13/0235; H04N 13/021; H04N 13/0239; H01L 27/14605; H01L 27/14623
USPC ........................................................... 348/49
See application file for complete search history.

(56) References Cited

U.S. PATENT DOCUMENTS

2009/0284727 A1 * 11/2009 Muramatsu et al. ............ 355/71
2010/0149389 A1    6/2010 Goto
(Continued)

FOREIGN PATENT DOCUMENTS

JP    2007-306406    11/2007
JP    2007-312311    11/2007
(Continued)

OTHER PUBLICATIONS

International Search Report, PCT/JP2012/066355, Jul. 31, 2012.

*Primary Examiner* — Andy Rao
*Assistant Examiner* — Jared Walker
(74) *Attorney, Agent, or Firm* — Young & Thompson

(57) ABSTRACT

An imaging apparatus includes: an image sensor having a plurality of light receiving elements arranged therein; a light shielding member disposed between an imaging optical system and the image sensor, the light shielding member configured to make only a light flux, which has passed through a predetermined area of the imaging optical system, incident on a first light receiving element which is a part of the plurality of light receiving elements; and an image generation device configured to generate an image of a subject from an imaging signal of the first light receiving element, in which the light shielding member is a plate-shaped member having a first light shielding material configured to shield a light flux, which has passed through an area other than the predetermined area, formed therein.

14 Claims, 11 Drawing Sheets

(51) Int. Cl.
*H04N 5/232* (2006.01)
*H04N 5/238* (2006.01)
*G03B 35/10* (2006.01)

(56) References Cited

U.S. PATENT DOCUMENTS

2011/0026005 A1* 2/2011 Kiuchi ............................ 355/72

2011/0063484 A1* 3/2011 Fujii et al. ..................... 348/294

FOREIGN PATENT DOCUMENTS

| | | |
|---|---|---|
| JP | 2010-128122 | 6/2010 |
| JP | 2010-210903 | 9/2010 |
| JP | 2011-095027 | 5/2011 |
| JP | 2011-124712 | 6/2011 |
| WO | WO 2009/107705 | 9/2009 |

* cited by examiner

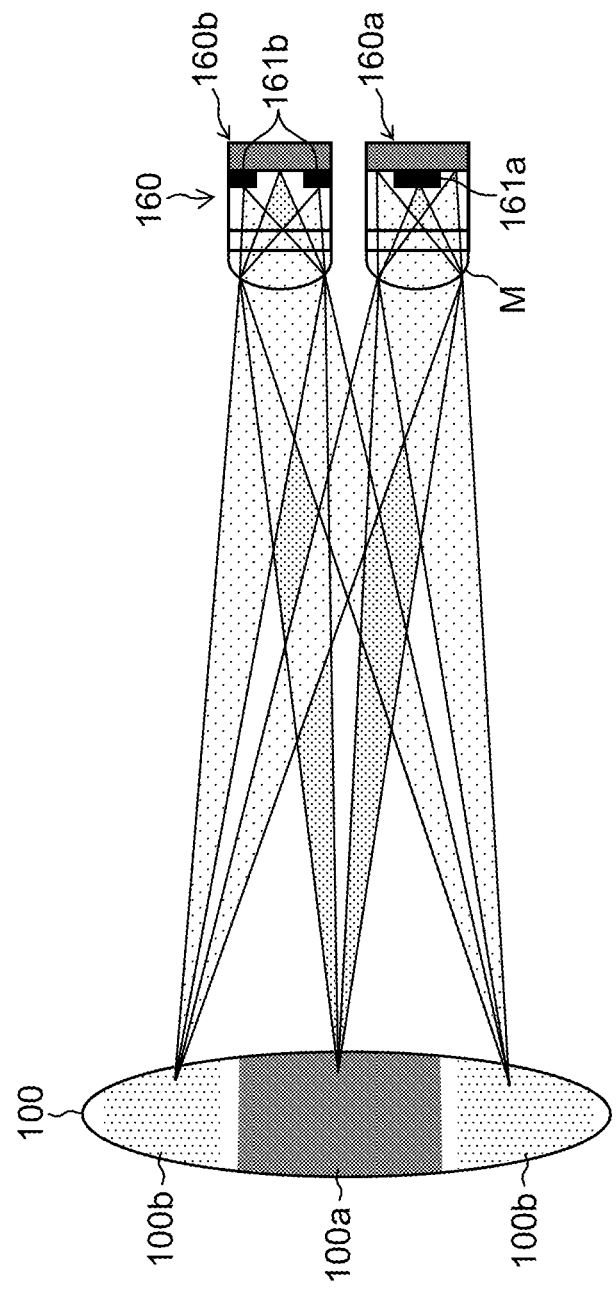

IMAGING APPARATUS

CROSS REFERENCE TO RELATED APPLICATIONS

This application is a continuation of PCT/JP2012/066355 filed on Jun. 27, 2012, which claims priority to Japanese Application No. 2011-167279 filed on Jul. 29, 2011. The entire contents of each of the above applications are hereby incorporated by reference.

BACKGROUND OF THE INVENTION

1. Field of the Invention

The presently disclosed subject matter relates to an imaging apparatus, and more particularly, to an imaging apparatus capable of simultaneously acquiring various images.

2. Description of the Related Art

Japanese Patent Application Laid-Open No. 2010-210903 discloses a focus detection optical system using a pupil division type phase difference detection system including a pair of focus detection pixels including a pixel having a light shielding mask, the left half of which is opened in a semicircular shape, and a microlens formed on the front of its light receiving surface and a pixel having a light shielding mask, the right half of which is opened in a semicircular shape, and a microlens formed on the front of its light receiving surface.

As illustrated in FIG. 13, a microlens M images light fluxes, which have passed through the imaging lens 100, on a light receiving surface of each of cells in an image sensor 160. A light shielding member 161a formed on the light receiving surface of a light receiving cell 160a in the image sensor 160 shields the light flux that has passed through a central area 100a of the imaging lens 100. Thus, only the light flux, which has passed through a peripheral edge area 100b of the imaging lens 100, is formed on the light receiving cell 160a. A light shielding member 161b formed on the light receiving surface of the light receiving cell 160b in the image sensor 160 shields the light flux that has passed through the peripheral edge area 100b of the imaging lens 100. Thus, only the light flux, which has passed through the central area 100a of the imaging lens 100, is formed on the light receiving cell 160b.

SUMMARY OF THE INVENTION

A technique for forming different images by pupil division is used for not only focus detection but also a single-lens stereoscopic imaging apparatus. In a single-lens stereoscopic imaging apparatus, light, which has passed through an imaging lens, is pupil-divided, and subject images, which have respectively passed through different areas of the imaging lens, are formed on an image sensor, to simultaneously acquire a plurality of images.

A technique and a single-lens stereoscopic imaging apparatus discussed in Japanese Patent Application Laid-Open No. 2010-210903, focus distance control (an image forming capability and a focus distance) of a microlens needs to be performed with high accuracy. If an image sensor becomes fine, however, a microlens having an accurate lens shape is difficult to manufacture. As a result, accuracy of the focus distance control of the microlens deteriorates, and a directional characteristic of the microlens decreases so that the pupil division cannot accurately be performed. Therefore, the image quality of a stereoscopic image to be captured by the single-lens stereoscopic imaging apparatus deteriorates. If a focus is detected, detection accuracy of the focus deteriorates.

In the technique and the single-lens stereoscopic imaging apparatus discussed in Japanese Patent Application Laid-Open No. 2010-210903, a light shielding mask is formed on the front of a light receiving surface so that the difficulty of manufacture of the image sensor increases. Further, a light shielding mask is formed on the front of the light receiving surface so that design changes of a shape and a position of a light shielding member and a request to supply a product including light shielding members in various positions and shapes are difficult to cope with.

The presently disclosed subject matter has been made in view of such circumstances, and is directed to providing an imaging apparatus capable of highly accurate pupil division in a simple configuration and capable of flexibly coping with a design change corresponding to the type of a product.

In order to attain the above-mentioned object, an imaging apparatus according to an aspect of the presently disclosed subject matter includes an imaging optical system, an image sensor having a plurality of light receiving elements two-dimensionally arranged therein, a light shielding member disposed between the imaging optical system and the image sensor for making only a light flux, which has passed through a predetermined area of the imaging optical system, incident on a first light receiving element serving as a part of the plurality of light receiving elements, and an image generation device configured to generate an image of a subject from an imaging signal of the first light receiving element, in which the light shielding member is a plate-shaped member having a first light shielding material formed to correspond to the first light receiving element and formed to shield a light flux, which has passed through an area other than the predetermined area, formed therein.

According to the above-mentioned aspect, the light shielding member serving as the plate-shaped member, having the first light shielding material formed to shield the light flux, which has passed through the predetermined area of the imaging optical system, formed therein is disposed between the imaging optical system and the image sensor, the first light shielding material shields the light flux, which has passed through the area other than the predetermined area, so that only the light flux, which has passed through the predetermined area, is incident on the first light receiving element, and the image of the subject is generated from the imaging signal of the first light receiving element. Thus, highly accurate pupil division can be performed in a simple configuration. According to the above-mentioned aspect, a design change corresponding to the type of a product of the imaging apparatus can flexibly be coped with.

The light shielding member may be a transparent glass plate having the first light shielding material formed on its surface by etching. Thus, a small light shielding material can accurately be formed in the light shielding member.

The light shielding member may be fixed to a position spaced by a predetermined distance apart from the image sensor. Thus, the light shielding material can shield all the light fluxes that have passed through the predetermined area of the imaging lens.

The light shielding member may be disposed to be movable in an optical axis direction. Alternatively, the light shielding member may be disposed to be movable in parallel along a surface perpendicular to an optical axis. Thus, the effect of the light shielding member can be eliminated without removing the light shielding member. Therefore, ON and OFF of the light shielding member can be switched in a simple configuration.

The imaging optical system may include a first area having a first characteristic and a second area having a second characteristic different from the first characteristic, the second area being wider than the first area. In this case, only the light flux, which has passed through the first area, is incident on the first light receiving element by the light shielding member, and light fluxes, which have respectively passed through the first area and the second area, are incident on a second light receiving element serving as the light receiving element other than the first light receiving element. The image generation device generates an image of the subject from the imaging signal of the second light receiving element. The imaging apparatus includes an image processing unit that performs at least one of blur correction processing, contrast correction processing, and interpolation processing of embedding a missing pixel when the image of the subject is generated from the imaging signal of the second image sensor.

Thus, the light fluxes, which have respectively passed through the first area and the second area, are incident. Therefore, a blur and a contrast deterioration occurring in image data obtained from the second light receiving element can be prevented. A missing pixel caused by the first light receiving element can be stored.

The imaging optical system may include a first area having a first characteristic and a second area having a second characteristic different from the first characteristic and having a wider area than that of the first area. The light shielding member may have a second light shielding material formed to correspond to the second light receiving element serving as the light receiving element other than the first light receiving element and formed so that only the light flux, which has passed through the second area, passes therethrough formed therein. The image generation device may generate an image of the subject from the imaging signal of the second light receiving element.

Thus, the light flux, which has passed through the first area, is incident on the first light receiving element, and the light flux, which has passed through the second area, is incident on the second light receiving element. Therefore, image processing such as blur correction and contrast correction can be eliminated.

The light shielding member may be formed so that a ratio occupied by the first area in the imaging optical system and a ratio occupied by the first light receiving element in the plurality of light receiving elements become substantially equal to each other. Thus, the image quality of a main image can be prevented from deteriorating.

The imaging optical system may include an area having a circular planar shape arranged at its center and an annular area arranged at an outer edge of the circular area. The circular area may be the second area, and the annular area may be the first area. Thus, the image quality of an image obtained from the light flux, which has passed through the first area, can be improved.

The imaging optical system may be a multifocal lens including a first area having a first focal length as the first characteristic and a second area having a longer focal length than the first focal length as the second characteristic. Thus, images, which differ in distance of the subject, such as a far distance image and a near distance image can be obtained.

According to the presently disclosed subject matter, there can be provided an imaging apparatus capable of performing highly accurate pupil division in a simple configuration and capable of flexibly coping with a design change corresponding to the type of product.

BRIEF DESCRIPTION OF THE DRAWINGS

FIG. 13 schematically illustrates a conventional example.

DETAILED DESCRIPTION OF EXEMPLARY EMBODIMENTS

A mode for implementing an imaging apparatus according to the presently disclosed subject matter will be described in detail below with reference to the accompanying drawings.
<First Embodiment>

Figure 1:
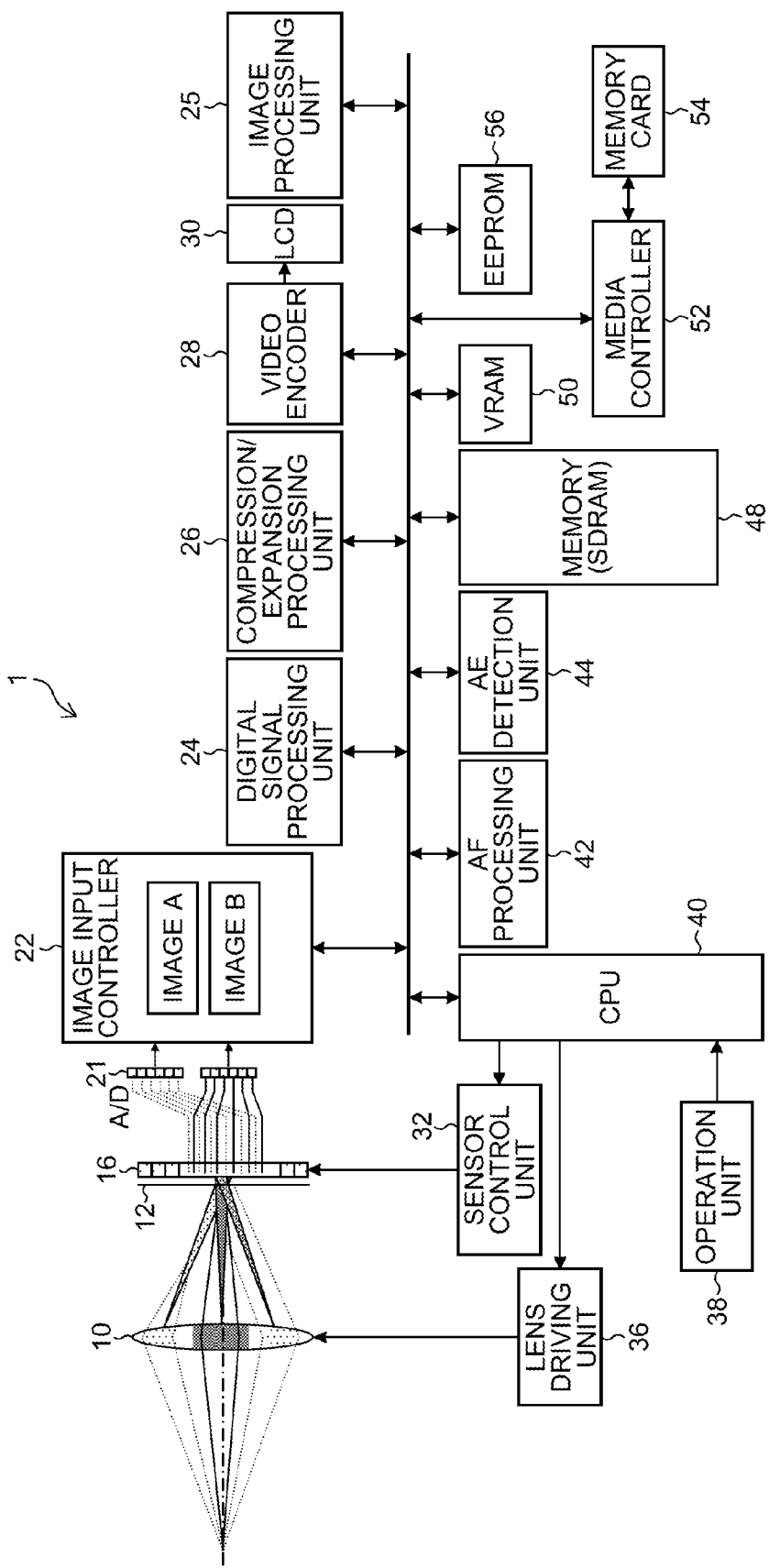
FIG. 1 is a block diagram illustrating an internal configuration of an imaging apparatus according to a first embodiment of the presently disclosed subject matter.

FIG. 1 is a block diagram illustrating an internal configuration of an imaging apparatus according to a first embodiment of the presently disclosed subject matter.

The imaging apparatus 1 records a captured image on a memory card 54. A central processing unit (CPU) 40 integrally controls the entire operation of the imaging apparatus 1.

The imaging apparatus 1 includes an operation unit 38 including a shutter button, a mode dial, a reproduction button, a MENU/OK key, a cross key, and a BACK key. A signal from the operation unit 38 is input to the CPU 40. The CPU 40 controls each circuit in the imaging apparatus 1 based on the input signal. Thus, lens driving control, diaphragm driving control, imaging operation control, image processing control, recording/reproduction control of image data, and display control of a liquid crystal monitor (a liquid crystal display (LCD)) 30 for stereoscopic display.

The shutter button is an operation button configured to input an instruction to start imaging, and is a two-stage stroke-type switch including an S1 switch that is turned on when the shutter button is half-pressed and an S2 switch that is turned on when the shutter button is full-pressed. The mode dial is a selection device configured to select any one of an auto imaging mode for capturing a still image, a manual imaging mode, a scene position for a person, a scene, a night scene, or the like, and a moving image mode for capturing a moving image.

The reproduction button is a button to switch an operation mode of the imaging apparatus 1 to a reproduction mode for displaying a still image or a moving image, which has been captured and recorded, on the liquid crystal monitor 30. The MENU/OK key is an operation key having both a function of a menu button to issue a command to display menus on a screen of the liquid crystal monitor 30 and a function of an OK button to issue a command to confirm and execute a selected content. The cross key is an operation unit that inputs instructions in four directions, i.e., upward and downward and leftward and rightward directions. The cross key is an operation unit (a cursor movement operation device) to select an item from a menu screen and issue an instruction to select various setting items from each of the menus. An upward/downward key in the cross key functions as a zoom switch during imaging or a reproduction zoom switch during a reproduction mode. A leftward/rightward key therein functions as a frame advance (forward/backward advance) button during the reproduction mode. The BACK key is used when a desired object such as a selected item is erased, and a content of instruction is canceled, or an operation state is returned to the previous one.

During an imaging mode, an image of subject light is formed on a light receiving surface of an image sensor 16 of a complementary metal oxide semiconductor (CMOS) type via an imaging optical system (imaging lens) 10, a diaphragm (not illustrated), and a light shielding member 12.

The imaging lens 10 is driven by a lens driving unit 36 controlled by the CPU 40. Thus, focus control, zoom control, or the like are performed.

The lens driving unit 36 moves a focus lens in an optical axis direction according to a command from the CPU 40, to perform focus adjustment. The lens driving unit 36 performs an advance/retreat operation of a zoom lens in the optical axis direction according to a command from the CPU 40, to change a focal length.

The diaphragm includes five diaphragm blades, for example. The CPU 40 controls the diaphragm in five stages by 1 AV (Aperture Value) from a diaphragm value F2.8 to a diaphragm value F11, for example.

Figure 4:
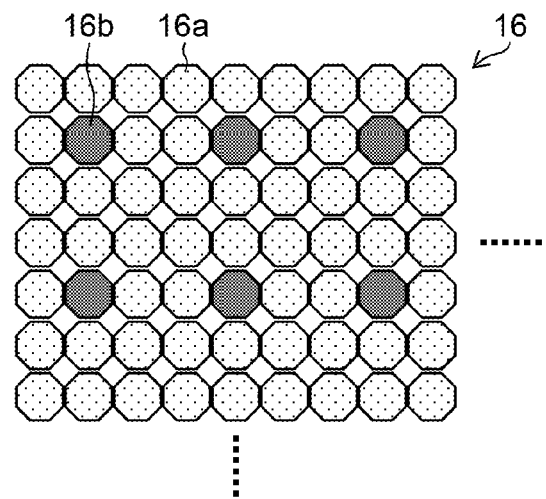
FIG. 4 is a plan view illustrating an arrangement of photo sensors in the image sensor.

A large number of photo sensors (light receiving elements) are two-dimensionally arranged on the light receiving surface of the image sensor 16 (see FIG. 4). A subject image formed on a light receiving surface of each of the photo sensors is converted into a signal voltage (or a charge) in an amount corresponding to an amount of incident light.

The light shielding member 12 is disposed parallel to the light receiving surface of the image sensor 16, i.e., parallel to a surface perpendicular to an optical axis, in front of the image sensor 16, i.e., between the imaging lens 10 and the image sensor 16.

Figure 2:
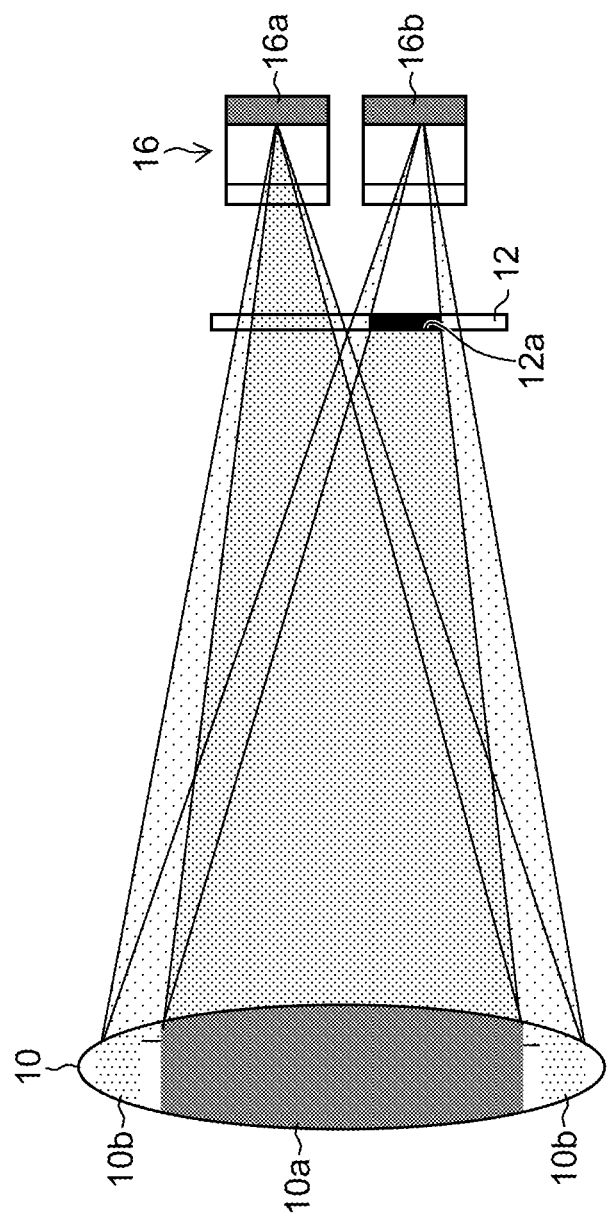
FIG. 2 schematically illustrates an imaging lens, a light shielding member, and an image sensor in the imaging apparatus according to the first embodiment of the presently disclosed subject matter.

FIG. 2 illustrates a positional relationship among the imaging lens 10, the light shielding member 12, and the image sensor 16 in the present embodiment. The imaging lens 10 is schematically represented by one lens in FIG. 2, although it may include a plurality of lenses. While two photo sensors are illustrated as the image sensor 16, and the light shielding member 12 is also illustrated in a size corresponding to the two photo sensors for simplicity in FIG. 2, photo sensors and light shielding members 12 in any number and in any size capable of imaging a subject are actually provided.

Figure 3:
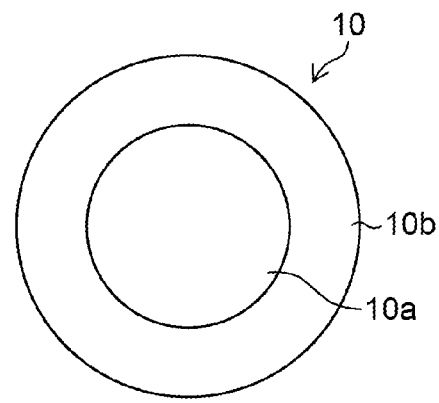
FIG. 3 is a plan view illustrating a shape of the imaging lens.

The imaging lens 10 is a bifocal lens including an area where light is converged at a short focal length and macro photographing can be performed (hereinafter referred to as a near focal area) and an area where light is converged at a longer focal length than that in the near focal area and a scene or the like can be photographed (hereinafter referred to as a far focal area). The imaging lens 10 includes an area that is circular in shape as viewed from the front (hereinafter referred to as planar shape) and an annular area at its peripheral edge, as illustrated in FIG. 3. The circular area at the center is a far focal area 10a, and the annular area is a near focal area 10b. The imaging lens 10 is formed so that the far focal area 10a is wider than the near focal area 10b.

Light fluxes, which have respectively passed through the far focal area 10a and the near focal area 10b in the imaging lens 10, are incident on each of the photo sensors in the image sensor 16. The image sensor 16 includes far-image light receiving cells 16a on which the light fluxes that have respectively passed through the far focal area 10a and the near focal area 10b, i.e., light fluxes that have passed through the entire exit pupil of the imaging lens 10 are incident and near-image light receiving cells 16b on which only the light flux that has passed through the near focal area 10b is incident. The near-image light receiving cells 16b are arranged at a ratio of one pixel to nine (3×3) pixels, as illustrated in FIG. 4. This is a result of the near-image light receiving cells 16b being arranged so that a ratio occupied by the near-image light receiving cells 16b in all the photo sensors (the sum of the far-image light receiving cells 16a and the near-image light receiving cells 16b) in the image sensor 16 is substantially the same as a ratio occupied by the near focal area 10b in the exit pupil (the sum of the far focal area 10a and the near focal area 10b) of the imaging lens 10. In the present embodiment, an image obtained from the far-image light receiving cell 16a is a main image (image data A), and an image obtained from the near-image light receiving cell 16b is a sub-image (image data B). A deterioration in image quality of the main image can be prevented by increasing the number of far-image light receiving cells 16a to match an area ratio between the entire exit pupil and the far focal area 10a in the imaging lens 10.

A transparent glass plate having a thickness of approximately 10 μm to 100 μm is used as a material for the light shielding member 12. A cover glass of the image sensor 16 can also be used as the light shielding member 12. The light shielding member 12 can also include not only glass but also a transparent film stretched across a plate-shaped frame.

Figure 5:
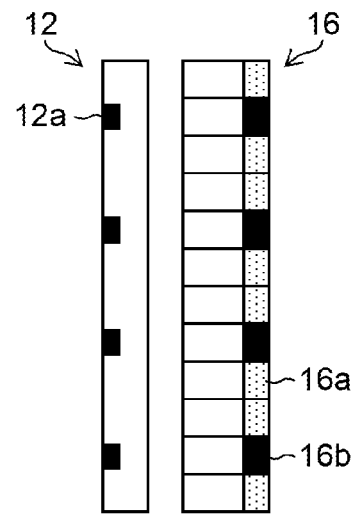
FIG. 5 schematically illustrates the light shielding member and the image sensor.

As illustrated in FIG. 5, the light shielding member 12 is provided with light shielding materials 12a, respectively, to correspond to the near-image light receiving cells 16b, i.e., to be positioned on front surfaces of the near-image light receiving cells 16b. The light receiving material 12a is a black area (area not transmitting light) formed by etching or the like on a surface of the light shielding member 12, and has a diameter of approximately 5 μm. "5 μm" is a value determined to be substantially the same as the diameter of each of the photo sensors in the image sensor 16. In the present embodiment, the near-image light receiving cells 16b are arranged at a ratio of one pixel to 9 (3×3) pixels. Thus, a gap between the light shielding materials 12a is approximately 15 μm. By forming the light shielding material 12a by etching, small light shielding materials 12a having a diameter of approximately 5 μm can accurately be formed at minute spacings.

The light shielding materials 12a are respectively provided to correspond to the near-image light receiving cells 16b. Thus, as illustrated in FIG. 2, the light shielding material 12a shields the light flux that has passed through the far focal area 10a, and only the light flux that has passed through the near focal area 10b is incident on the near-image light receiving cell 16b according to a principle of a shadow picture. Such a configuration enables only a light flux that has passed through a desired area of an imaging lens system to be received in a photo sensor without using a microlens.

Figure 6:
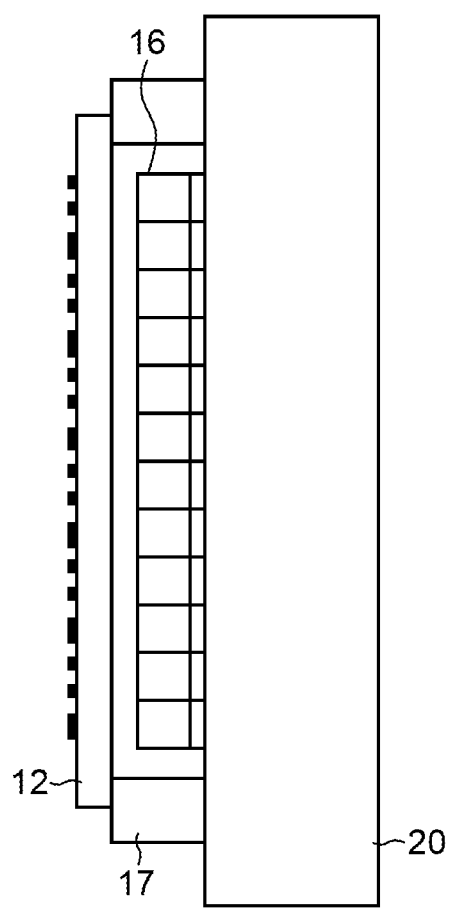
FIG. 6 illustrates a method of attaching the light shielding member.

In order to shield all the light fluxes that have passed through the far focal area 10a by the light shielding material 12a, a distance in the optical axis direction between the image sensor 16 and the light shielding member 12 (the light shielding material 12a) becomes important. As illustrated in FIG. 6, a flange 17 is disposed to surround the image sensor 16, and the light shielding member 12 is disposed to abut on an end surface of the flange 17. The image sensor 16 and the flange 17 have respective back surfaces fixed to the same surface 20 in a camera body. Thus, the light shielding member 12 is accurately positioned by being made to abut on the end surface of the flange 17. Therefore, the distance in the optical axis direction between the image sensor 16 and the light shielding member 12 can be kept appropriate by setting the height of the flange 17 to an appropriate value. A space between the image sensor 16 and the light shielding member 12 may be filled with air, or may be filled with an optical medium (e.g., a transparent liquid, an adhesive, etc.).

While 12 photo sensors are illustrated in the image sensor 16, and four light shielding materials 12a are illustrated in the light shielding member 12 in FIG. 5, the respective numbers of such optical elements is not limited to these. Also in FIG. 6, the number of photo sensors in the image sensor 16 and the number of light shielding materials 12 in the light shielding member 12 are not limited, respectively, to the numbers as illustrated.

Light incident on the image sensor 16 is converted into a charge corresponding to its light amount, and the charge is stored in the photo sensor itself or a capacitor attached thereto. The charge stored in the image sensor 16 is read out as a voltage signal corresponding to its charge amount according to a driving signal from a sensor control unit 32. The voltage signal, together with information about its corresponding pixel position, is stored. A voltage signal for each of the pixels, together with selection information of the position of the pixel to be read out, is read out using a method of a MOS-type image sensor (so-called a CMOS sensor) using an X-Y address system, for example.

The voltage signal, which has been read out of the image sensor 16, is subjected to correlation double sampling processing (processing for reducing noise (particularly, thermal noise) or the like included in an output signal of the image sensor). More specifically, red (R), green (G), and blue (B) signals for each pixel are sampled and held by processing of calculating a difference between a field through component level (a signal in a zero level period during which a signal level is zero) and a pixel signal component level, which are included in an output signal for each pixel of the image sensor 16, to obtain accurate pixel data, are amplified, and are then added to an analog-to-digital (A/D) converter 21. The A/D converter 21 converts analog voltage signals (R, G, and B signals) to be sequentially input into digital R, G, and B signals, and outputs the digital R, G, and B signals to an image input controller 22.

A digital signal processing unit 24 performs predetermined signal processing such as gain control processing including offset processing, white balance correction, and sensitivity correction, gamma correction processing, and luminance/chrominance (YC) processing (processing of converting R, G, and B color signals into luminance and color difference signals) for the digital image signals input via the image input controller 22.

Image data, which has been processed by the digital signal processing unit 24, is input to a video random access memory (VRAM) 50. The image data, which has been read out of the VRAM 50, is encoded in a video encoder 28, and is output to the liquid crystal monitor 30 for stereoscopic display. Thus, a three-dimensional (3D) subject image is displayed on a display screen of the liquid crystal monitor 30.

When the shutter button in the operation unit 38 is pressed in a first stage (half-pressed), the CPU 40 starts an automatic-focus (AF) operation and an automatic exposure (AE) operation, to perform control so that the focus lens in the imaging lens 10 reaches an in-focus position via the lens driving unit 36. Image data output from the A/D converter 21 when the shutter button is half-pressed is accepted in an AE detection unit 44.

In the AE detection unit 44, G signals on the entire screen are accumulated, or G signals to which different weights are respectively applied at the center and the periphery of the screen are accumulated. Their accumulated value is output to the CPU 40. The CPU 40 calculates the brightness of the subject (an imaging exposure value (Ev)) from the accumulated value input from the AE detection unit 44. The CPU 40 determines a diaphragm value of the diaphragm and an electronic shutter (a shutter speed) of the image sensor 16 based on the imaging Ev according to a predetermined program diagram. The CPU 40 controls the diaphragm via a diaphragm driving unit (not illustrated) based on the determined diaphragm value, and controls a charge storage time in the image sensor 16 via a sensor control unit 32 based on the determined shutter speed.

An AF processing unit 42 performs contrast AF processing or phase AF processing. When the contrast AF processing is performed, a high-frequency component of an image data portion, within a predetermined focus area, of the image data is extracted, and the high-frequency component is integrated, to calculate an AF evaluation value representing an in-focus state. AF control is performed by controlling the focus lens in the imaging lens 10 so that the AF evaluation value becomes maximal. When the phase difference AF processing is performed, a phase difference between an image data portion (image data A) corresponding to a main pixel (the far-image light receiving cell 16a) and an image data portion (image data B) corresponding to a sub-pixel (the near-image light receiving cell 16b) within a predetermined focus area, of the image data is detected, and a defocus amount is found based on information representing the phase difference. AF control is performed by controlling the focus lens in the imaging lens 10 so that the defocus amount becomes zero.

When the AE operation and the AF operation end, and the shutter button is pressed in the second stage (full-pressed), image data output from the A/D converter 21 is input to a memory (a synchronous dynamic random access memory (SDRAM)) 48 from the image input controller 22 in response to the press, and is temporarily stored. In the present embodiment, either one or both of the image data A, which has been read out of the far-image light receiving cell 16a, and the image data B, which has been read out of the near-image light receiving cell 16b, can be acquired in response to an instruction by a photographer or automatically by the CPU 40.

The image data temporarily stored in the memory 48 is read out, as needed, by the digital signal processing unit 24. Here, predetermined signal processing including generation processing of generating luminance data and color difference data from the image data (YC processing) is performed. The image data that has been subjected to the YC processing (YC data) is stored in the memory 48 again.

Then, the YC data is read and output to an image processing unit 25 from the memory 48. The image processing unit 25 performs image processing of the image data A read out of the far-image light receiving cell 16*a* and the image data B read out of the near-image light receiving cell 16*b*. The image processing unit 25 generates a far distance image from the image data A read out of the far-image light receiving cell 16*a*, and generates a macro image from the image data B read out of the near-image light receiving cell 16*b*. Processing performed by the image processing unit 25 will be described below.

If the subject light to be incident on the far-image light receiving cell 16*a* is only the light flux that has passed through the far focal area 10*a*, the subject image becomes a point image. However, in the present embodiment, the light fluxes, which have respectively passed through the far focal area 10*a* and the near focal area 10*b*, are incident on the far-image light receiving cell 16*a*. Thus, the subject light, which has passed through the near focal area 10*b*, becomes a blur component, to be a blurred image (large point image). Therefore, blur correction processing is performed for the image data A read out of the far-image light receiving cell 16*a*, to correct a blur due to mixing of a component of the macro image that has passed through the near focal area 10*b*. Various methods such as filtering processing using a restoration filter, for example, can be applied as the blur correction processing.

If the subject light to be incident on the far-image light receiving cell 16*a* is only the light flux that has passed through the far focal area 10*a*, the contrast of the subject image becomes clear. However, in the present embodiment, the light fluxes, which have respectively passed through the far focal area 10*a* and the near focal area 10*b*, are incident on the far-image light receiving cell 16*a*. Thus, a brightness/darkness difference in the image becomes inconspicuous due to the subject light that has passed through the near focal area 10*b* so that the contract can be deteriorated. Therefore, contract correction processing is performed for the image data A read out of the far-image light receiving cell 16, to correct the deterioration in the contrast due to the mixing of the component of the macro image that has passed through the near focal area 10*b*. The contrast correction processing can include various methods such as processing of emphasizing a difference between a bright portion and a dark portion (e.g., processing of enlarging a value of a luminance (Y) signal at a predetermined ratio after converting the RGB signals into luminance/color difference (YCrCb) signals to obtain information about the brightness/darkness difference, to enlarge a distribution of the Y signal, i.e., a lightness difference). A method of correcting the deterioration in the contrast may include contour emphasis processing (see, e.g., Japanese Patent Application Laid-Open No. 2011-124712).

Further, the image sensor 16 includes the near-image light receiving cells 16*b* at a ratio of one pixel to nine (3×3) pixels (see FIG. 4). Thus, the far distance image generated from the image data B read out of the far-image light receiving cells 16*a* does not include data corresponding to a pixel position where the near-image light receiving cell 16*b* exists. Therefore, interpolation processing is performed for a missing pixel caused by existence of the near-image light receiving cell 16*b* based on the image data read out of the far-image light receiving cell 16*a* surrounding the missing pixel, to generate image data corresponding to a pixel position of the missing pixel (self-interpolation processing). The interpolation processing is known, and hence description thereof is omitted. A row number used for interpolation and a form of weighting are selectable, as needed.

For the image data read out of the far-image light receiving cell 16*a*, all types of processing need not necessarily be performed. All types of processing may be performed. Alternatively, any type of processing may be performed.

A light flux a part of which has been shielded by the light shielding material 12*a* (preferably, only a light flux that has passed through the near focal area 10*b*) is incident on the near-image light receiving cell 16*b*. Thus, it is not essential to implement the blur correction processing and the contrast correction processing for the image data B read out of the near-image light receiving cell 16*b*.

The size of the near focal area 10*b* is sufficiently smaller than the size of the far focal area 10*a*, and the near-image light receiving cells 16*b* are smaller in number than the far image light receiving cells 16*a* (at a ratio of one pixel to nine (3×3) pixels in the present embodiment). Thus, the macro image generated from the image data B obtained from the near-image light receiving cell 16*b* becomes dark. Therefore, a processing of increasing the brightness of the image data B read out of the near-image light receiving cell 16*b* is performed. However, this processing is not essential.

Each of the far distance image and the macro image, which have thus been subjected to the image processing in the image processing unit 25, is output to a compression/expansion processing unit 26, and is subjected to processing of compression into compressed data having a predetermined format such as Joint Photographic Experts Group (JPEG).

If a multi-picture file (a MP file: a file having a format in which a plurality of images is connected) is generated from the compressed data, the compressed data is temporarily stored in the memory 48 again. An MP file for storing the plurality of compressed data stored in the memory 48 (e.g., the far distance image obtained from the far-image light receiving cell 16*a* and the macro image obtained from the near-image light receiving cell 16*b*) is generated. The generated MP file is recorded on a memory card 54 via a media controller 52.

The far distance image and the macro image may respectively be stored in individual image files (e.g., JPEG). In this case, the image file storing the far distance image and the image file storing the macro image are associated with each other and are recorded. The association between the image file storing the far distance image and the image file storing the macro image is performed using a method of including a common character string in a file name of each of the image files and a method of recording information representing a correspondence relationship between the image files on attached information (header information) of the image file or a dedicated management file, for example.

At the time of the reproduction mode, the image file, selected via the operation unit 38, out of the image files recorded on the memory card 54, is read out via a media controller 52. The compressed data in the read image file is expanded by the compression/expansion processing unit 26, and is output to the liquid crystal monitor 30 via the video encoder 28. Thus, the image data is reproduced and displayed.

According to the present embodiment, only the light flux that has passed through the predetermined area of the lens 10 can be incident on the photo sensor in a simple configuration in which the light shielding member 12 is provided in front of the image sensor 16. More specifically, a directional characteristic of incident light to be incident on the image sensor 16 can be controlled. The microlens need not be used. Thus, the manufacturing cost can be reduced. If the cover glass of the image sensor 16 is used as the light shielding member 12, the control of the directional characteristic in the image sensor 16 can be implemented without increasing the number of members.

If the light shielding member 12 is generated by a member separate from the image sensor 16, the light shielding member 12 is easy to remove. Even if a desired directional characteristic is not obtained, therefore, a mounting position or the like of the light shielding member 12 is easy to correct so that the manufacturing cost can be reduced. A case where various types of products are produced in small quantities and a case where a design change is performed can also be coped with without increasing the cost.

According to the present embodiment, if the light shielding member 12 is arranged outside the image sensor 16, incidence of noise caused by diffraction of light on an end surface of the light shielding material 12*a* onto the image sensor 16 can be reduced. Thus, the deterioration in image quality can be reduced.

In the present embodiment, the imaging lens 10 formed so that the far focal area 10*a* becomes wider than the near focal area 10*b* is used in the present embodiment, a relationship between the respective sizes of the far focal area 10*a* and the near focal area 10*b* is not limited to this. For example, the near focal area 10*b* may be wider than the far focal area 10*a*. Alternatively, the respective areas of the far focal area 10*a* and the near focal area 10*b* may be substantially the same.

While the light fluxes, which have respectively passed through the far focal area 10*a* and the near focal area 10*b*, are incident on the far-image light receiving cell 16*a*, and the light flux, which has passed through the near focal area 10*b*, is incident on the near-image light receiving cell 16*b*, the presently disclosed subject matter is not limited to this. For example, only the light flux, which has passed through the far focal area 10*a*, may be incident on the far-image light receiving cell 16*a* by changing the arrangement and the shape of the light shielding material 12*a*.

Figure 7:
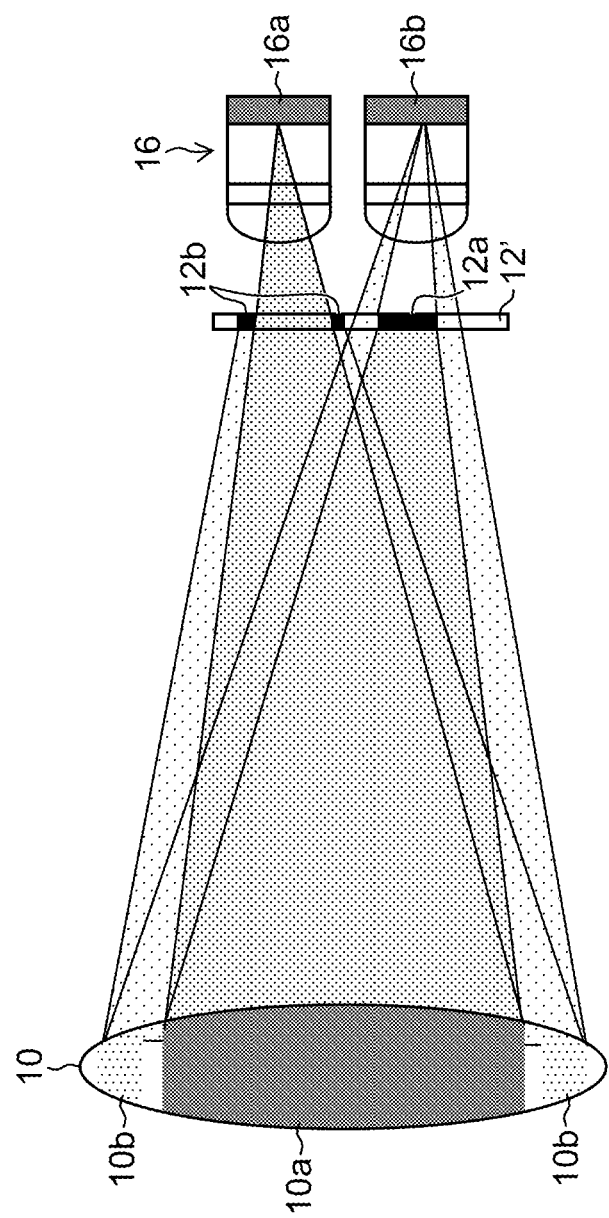
FIG. 7 illustrates a modified example of the imaging apparatus.

FIG. 7 schematically illustrates an imaging lens 10, a light shielding member 12', and an image sensor 16 when a light flux that has passed through a far focal area 10*a* is incident on a far-image light receiving cell 16*a* and a light flux that has passed through a near focal area 10*b* is incident on a near-image light receiving cell 16*b*. The same constituent elements as those in the embodiment illustrated in FIG. 2 are assigned the same reference numerals, and hence description thereof is not repeated. For FIG. 7, each of optical elements is not limited to this form, like for FIG. 2.

The image sensor 16 includes the far-image light receiving cell 16*a* on which the light flux that has passed through the far focal area 10*a* is incident and the near-image light receiving cell 16*b* on which only the light flux that has passed through the near focal area 10*b* is incident.

In the light shielding member 12', a light shielding material 12*a* is formed to correspond to the near-image light receiving cell 16*b*, and a light shielding material 12*b* is formed to correspond to the far-image light receiving cell 16*a*. The light shielding material 12*b* is formed by etching or the like on a surface of the light shielding member 12', and is a black area (not transmitting light) in a donut shape having a diameter of approximately 5 μm having a circular opening at its center.

The light shielding member 12' is arranged so that the light shielding material 12*a* corresponds to the near-image light receiving cell 16*b* and the light shielding material 12*b* corresponds to the far-image light receiving cell 16*a*. More specifically, the light shielding member 12' is provided so that the light shielding material 12*a* is positioned in front of the near-image light receiving cell 16*b*, and the far-image light receiving cell 16*a* is positioned in front of the light shielding material 12*b*.

According to a principle of a shadow picture, the light shielding material 12*b* shields the light flux that has passed through the near focal area 10*b*, and only the light flux that has passed through the far focal area 10*a* is incident on the far-image light receiving cell 16*a*.

Such a configuration causes only the light flux, which has passed through the far focal area 10*a*, to be incident on the far-image light receiving cell 16*a*. Thus, in an example illustrated in FIG. 7, a component of a macro image, which has passed through the near focal area 10*b*, is not mixed. Therefore, the image processing unit 25 need not perform blur correction processing and contrast correction processing so that the cost can be reduced.

In the example illustrated in FIG. 7, only the light flux, which has passed through the far focal area 10*a*, is incident on the far-image light receiving cell 16*a*. Thus, not the imaging lens 10 formed so that the far focal area 10*a* is wider than the near focal area 10*b* but an imaging lens in which a far focal area 10*a* and a near focal area 10*b* are of substantially the same size may be used. However, if the far distance image is set to a main image and the macro image is set to a sub-image, the imaging lens 10 is desirably formed so that the far focal area 10*a* is wider than the near focal area 10*b* from a viewpoint of balances in an image quality and a light amount.

While no microlens is provided in the present embodiment, a microlens may be used if there is a problem in terms of a space, for example. In this case, a light shielding member is provided in front of the microlens so that only light, which has passed through the light shielding member 12, may be incident on the microlens.

While the shielding member 12 is positioned by fixing the image sensor 16 and the flange 17 to the surface 20 in the camera body and making the light shielding member 12 abut on the end surface of the flange 17, a method of positioning the light shielding member 12 is not limited to this.

Figure 8:
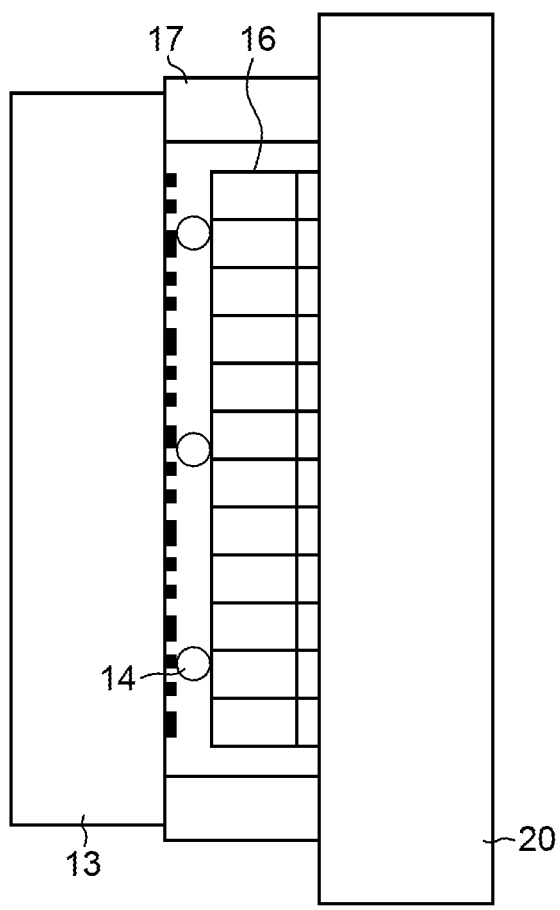
FIG. 8 illustrates a modified example of the imaging apparatus.

FIG. 8 illustrates a different method of positioning the light shielding member 12.

A light shielding member 13 is a glass plate, for example. A light shielding unit is formed by etching or the like on a surface of the light shielding member 13. To reliably determine a distance in an optical axis direction between an image sensor 16 and the light shielding member 12, the light shielding member 13 is provided so that the light shielding unit opposes the image sensor 16 and a transparent spacer 14 is sandwiched between the light shielding member 13 and the image sensor 16. The spacer 14 has a size of several micrometers, and can use a member such as a bead used to keep a gap between liquid crystal glasses.

<Second Embodiment>

While a position in an optical axis direction of a light shielding member is accurately positioned by making the light shielding member abut on an end surface of a flange and fixing the light shielding member thereto in the first embodiment of the presently disclosed subject matter, a method of attaching the light shielding member is not limited to this.

In a second embodiment of the presently disclosed subject matter, a light shielding member is disposed movably in an optical axis direction. An imaging apparatus 2 according to the second embodiment will be described below. The same constituent elements as those in the first embodiment are assigned the same reference numerals, and description thereof is not repeated.

Figure 9:
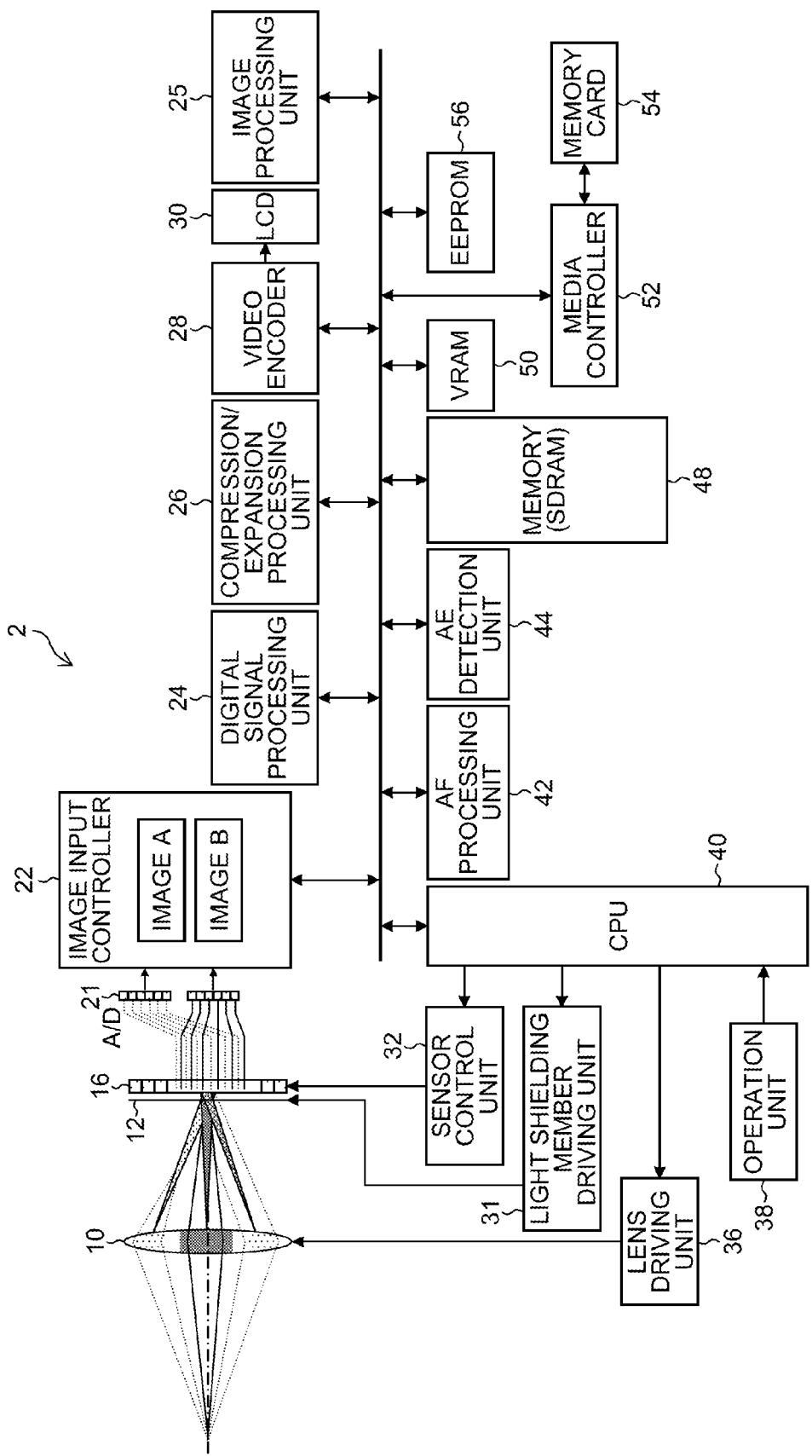
FIG. 9 is a block diagram illustrating an internal configuration of an imaging apparatus according to a second embodiment of the presently disclosed subject matter.

FIG. 9 is a block diagram illustrating an internal configuration of the imaging apparatus 2. A light shielding member 12 is disposed movably in an optical axis direction, and is moved in the optical axis direction by a light shielding member driving unit 31. Various actuators can be used as the light shielding member driving unit 31.

For example, a plurality of rod-shaped members is movably provided on a surface (a reference numeral 20 illustrated in FIGS. 6 and 8) in a camera body to which a back surface of an image sensor 16 is fixed. The light shielding member 12 is urged with a force in a direction to abut on tip ends of the rod-shaped members. The shielding member driving unit 31 moves the rod-shaped members in the optical axis direction. Such a configuration enables a position in the optical axis direction of the light shielding member 12 to change. The rod-shaped members are disposed to be in front of a light receiving surface of the image sensor 16 (on the side closer to an imaging lens 10 and in a leftward direction illustrated in FIGS. 9 and 10A-10B) even when they have farthest retreated (on the side farther from the imaging lens 10 and in a rightward direction illustrated in FIGS. 9 and 10A-10B). However, a configuration in which the light shielding member 12 is disposed movably in the optical axis direction is not limited to this.

Figure 10A:
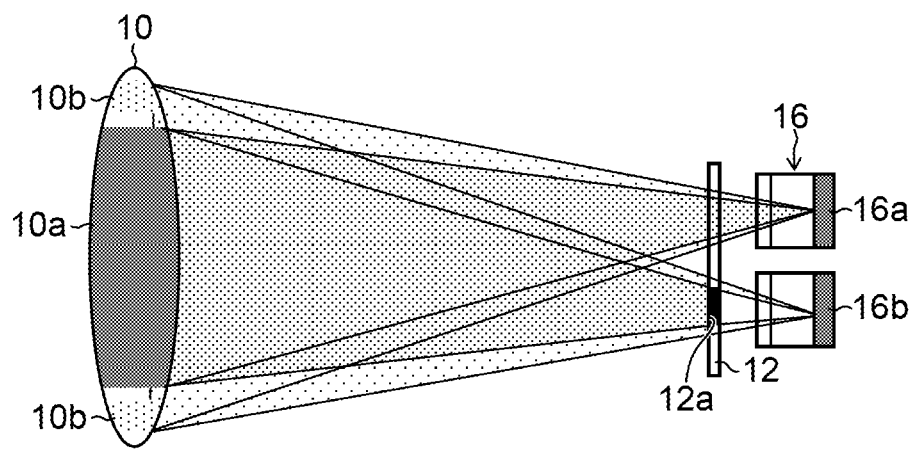
FIG. 10A schematically illustrates an imaging lens, a light shielding member, and an image sensor in the imaging apparatus according to the second embodiment of the presently disclosed subject matter.
Figure 10B:
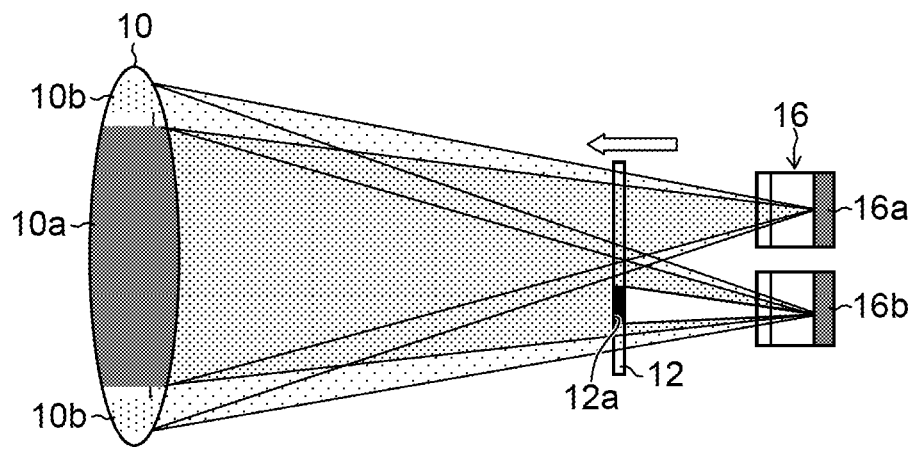
FIG. 10B schematically illustrates the imaging lens, the light shielding member, and the image sensor in the imaging apparatus according to the second embodiment of the presently disclosed subject matter.

FIGS. 10A and 10B schematically illustrate the imaging lens 10, the light shielding member 12, and the image sensor 16 in the present embodiment. While the imaging lens 10 includes a plurality of lenses, it is schematically represented by one lens in FIGS. 10A and 10B. While two photo sensors are illustrated as the image sensor 16, and the light shielding member 12 is illustrated in a size corresponding to the two photo sensors for simplicity in FIGS. 10A and 10B, optical elements in any number and in any size capable of imaging a subject are actually provided.

FIG. 10A illustrates a case where the light shielding member 12 is at a position closest to the image sensor 16. A geometrically positional relationship among the imaging lens 10, the light shielding member 12, and the image sensor 16 is in a situation similar to that in the first embodiment (in the situation illustrated in FIG. 2). In this case, a distance in the optical axis direction between the image sensor 16 and a light shielding material 12a is appropriate. Thus, light fluxes, which have respectively passed through a far focal area 10a and a near focal area 10b, are incident on a far-image light receiving cell 16a, and only a light flux, which has passed through the near focal area 10b, is incident on a near-image light receiving cell 16b, like in the first embodiment.

On the other hand, FIG. 10B illustrates a case where the light shielding member 12 is moved to a position farthest from the image sensor 16. A distance in the optical axis direction between the image sensor 16 and the light shielding material 12a is not appropriate. In this case, the light shielding material 12a shields only a part of the light flux that has passed through the far focal area 10a. Thus, the part of the light flux, which has passed through the far focal area 10a, is incident on the near-image light receiving cell 16b. Therefore, the light fluxes, which have respectively passed through the far focal area 10a and the near focal area 10b, are incident on the near-image light receiving cell 16b. Thus, an effect of light shielding by the light shielding member 12 can be suppressed or eliminated by changing the distance between the light shielding member 12 and the image sensor 16.

A light amount of subject light, which has passed through the far focal area 10a, is reduced by an amount of light shielded by the light shielding material 12a. However, the near-image light receiving cells 16b are arranged at a ratio of one pixel to nine pixels of the photo sensors. If one image is obtained from image data acquired from the far-image light receiving cell 16a and the near-image light receiving cell 16b while the effect of light shielding by the light shielding member 12 is suppressed, as illustrated in FIG. 10B, therefore, the one image is less affected by a decrease in the light amount by the light shielding.

According to the present embodiment, the effect of the light shielding member 12 can be suppressed without removing the light shielding member 12 by moving the light shielding member 12 in the optical axis direction. Therefore, ON and OFF of the light shielding member 12 can be switched in a simple configuration. If the effect of the light shielding member 12 is eliminated, self-interpolation processing need not be performed so that a time required for image processing can be shortened.

<Third Embodiment>

While a light shielding member is disposed movably in an optical axis direction in the second embodiment of the presently disclosed subject matter, a movement direction of the light shielding member is not limited to this.

In a third embodiment of the presently disclosed subject matter, a light shielding member 12 is disposed movably in a direction perpendicular to an optical axis direction. An imaging apparatus 3 according to the third embodiment will be described below. The same constituent elements as those in the first embodiment are assigned the same reference numerals and hence, description thereof is not repeated.

Figure 11:
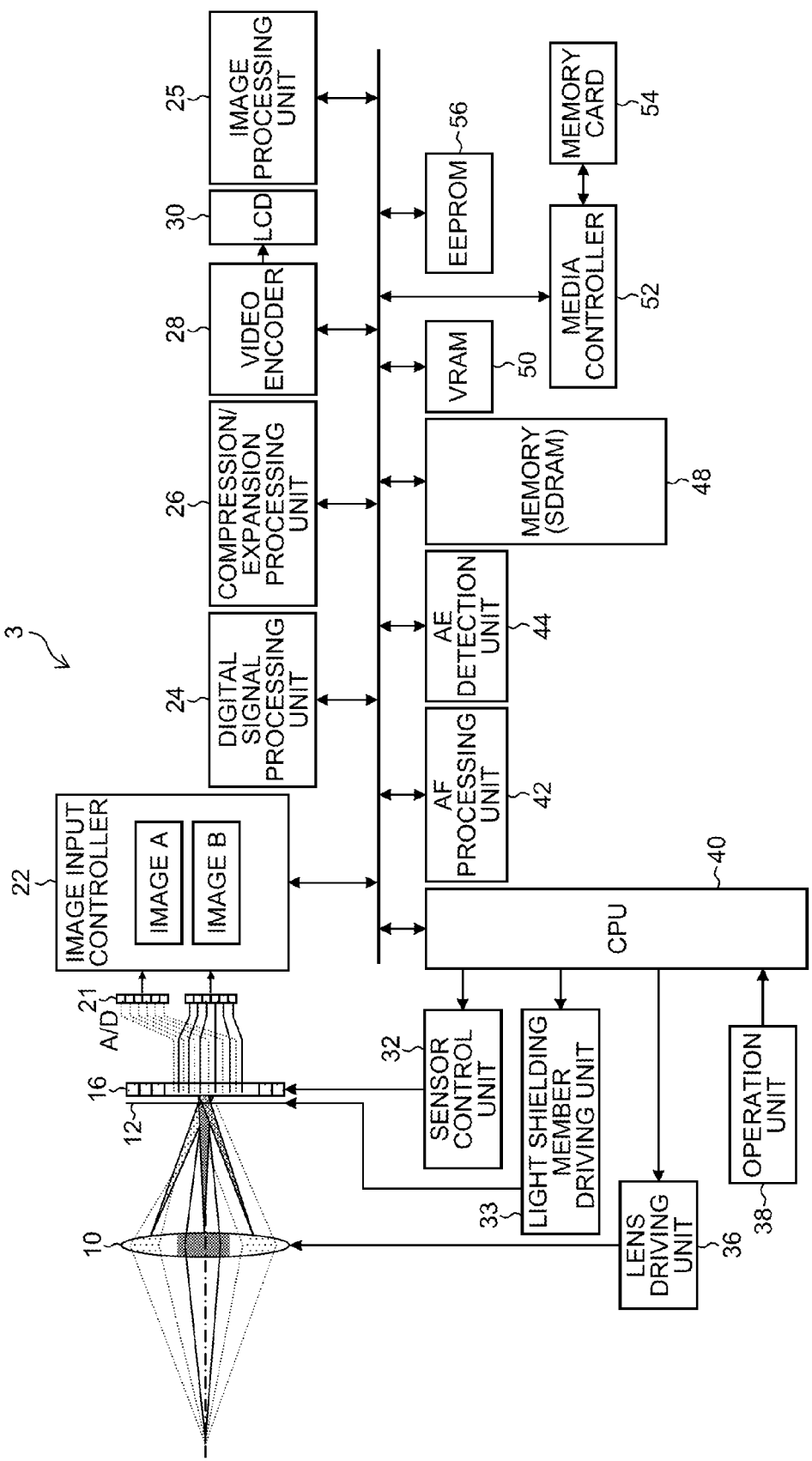
FIG. 11 is a block diagram illustrating an internal configuration of an imaging apparatus according to a third embodiment of the presently disclosed subject matter.

FIG. 11 is a block diagram illustrating an internal configuration of the imaging apparatus 3. A light shielding member 12 is disposed so that its surface on which a light shielding material 12a is formed is perpendicular to an optical axis. The light shielding member 12 is disposed movably in parallel within the surface perpendicular to the optical axis. A light shielding member driving unit 33 moves the light shielding member 12 up and down and left and right in the surface perpendicular to the optical axis. Here, "Up and down and left and right" means an up and down direction (an up and down direction in FIGS. 9 and 10A-10B) and a left and right direction (a direction perpendicular to a paper surface of FIGS. 9 and 10A-10B) when the light shielding member 12 is viewed from the imaging lens 10. Various actuators can be used as the light shielding member driving unit 33. A distance in the optical axis direction between the light shielding member 12 and an image sensor 16 is similar to that in the first embodiment (in the situation illustrated in FIG. 2).

A device for moving the light shielding member 12 in parallel in the surface perpendicular to the optical axis may also serve as a so-called image blur correction device that detects vibration added to the apparatus and moves the image sensor 16 in response to a detection signal of the vibration. For details of the image blur correction device, description thereof is omitted.

Figure 12A:
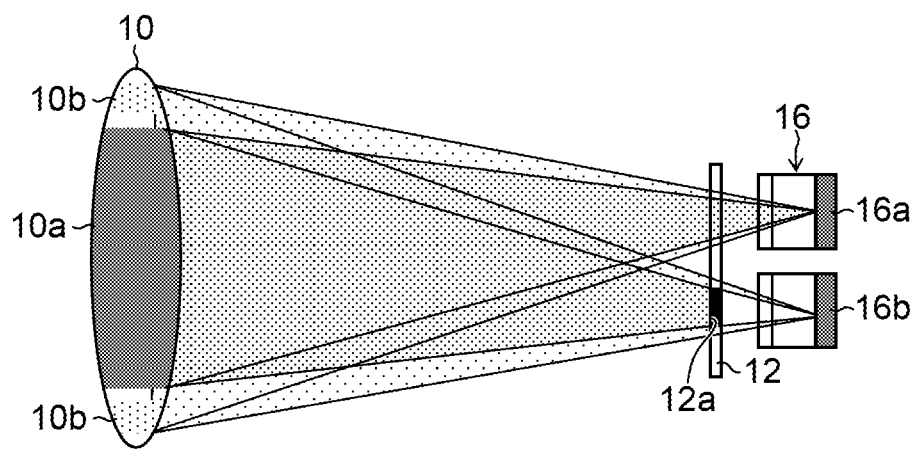
FIG. 12A schematically illustrates an imaging lens, a light shielding member, and an image sensor in the imaging apparatus according to the third embodiment of the presently disclosed subject matter.
Figure 12B:
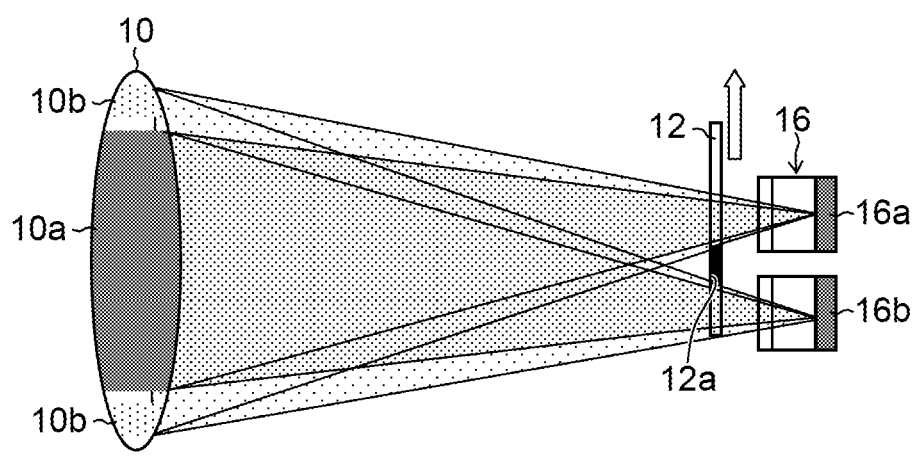
FIG. 12B schematically illustrates the imaging lens, the light shielding member, and the image sensor in the imaging apparatus according to the third embodiment of the presently disclosed subject matter.

FIGS. 12A and 12B schematically illustrate the imaging lens 10, the light shielding member 12, and the image sensor 16 in the present embodiment. The imaging lens 10 is schematically represented by one lens in FIGS. 12A and 12B, although it may include a plurality of lenses. While two photo sensors are illustrated as the image sensor 16, and the light shielding member 12 is illustrated in a size corresponding to the two photo sensors for simplicity in FIGS. 12A and 12B, optical elements in any number and any size capable of imaging a subject are actually provided.

FIG. 12A illustrates a case where the light shielding member 12 is at a basic position. A geometrically positional relationship among the imaging lens 10, the light shielding member 12, and the image sensor 16 is similar to that in the first embodiment (in the situation illustrated in FIG. 2). In this case, the light shielding material 12a is positioned in front of a near-image light receiving cell 16b. Therefore, light fluxes, which have respectively passed through a far focal area 10a and a near focal area 10b, are incident on a far-image light receiving cell 16a, and only a light flux, which has passed through the near focal area 10b, is incident on the near-image light receiving cell 16b.

On the other hand, FIG. 12B illustrates a case where the light shielding member 12 is moved upward from the basic position. The light shielding material 12a does not shield the light fluxes that are respectively incident on the far-image light receiving cell 16a and the near-image light receiving cell 16b. Alternatively, the light shielding material 12a shields a part of the light flux, which has passed through the near focal area 10b, to be incident on the far-image light receiving cell 16a while shielding a part of the light flux, which has passed through the near focal area 10b, to be incident on the near-image light receiving cell 16b. Therefore, the light fluxes, which have respectively passed through the far focal area 10a and the near focal area 10b, are incident on the near-image light receiving cell 16b. More specifically, an effect of light shielding by the light shielding member 12 can be suppressed or eliminated by moving the light shielding member 12 in a direction perpendicular to the optical axis.

A light amount of subject light, which has passed through the near focal area 10b, is reduced by an amount of light shielded by the light shielding material 12a. Thus, a blur and a contrast deterioration due to mixing of a component of a macro image are reduced so that an image quality can be improved.

According to the present embodiment, the effect of the light shielding member 12 can be suppressed without removing the light shielding member 12 by moving the light shielding member 12 in the direction perpendicular to the optical axis direction. Therefore, ON and OFF of the light shielding member can be switched in a simple configuration. If the effect of the light shielding member is eliminated, self-interpolation processing need not be performed so that a time required for image processing can be shortened.

While description has been made with an example in which a CMOS is used as the image sensor in the first to third embodiments, the image sensor is not limited to the CMOS. An image sensor such as a charge-coupled device (CCD) can also be used. The second and third embodiments may be combined with each other.

While the bifocal lens including the circular far focal area 10a at the center and the annular near focal area 10b is used as the imaging lens 10 in the first to third embodiments, the embodiment of the imaging lens 10 is not limited to this. For example, a bifocal lens including a circular near distance area at the center and an annular far distance area may be used. A bifocal lens including different focus lenses, respectively, in its upper and lower halves may be used. Alternatively, a trifocal lens having focal lengths, which are all different in a circular area at the center, an annular area on the outer side thereof, and an annular area on the outer side thereof may be used. A multifocal lens having three or more different focal lengths, may be used. The imaging lens 10 is not limited to the multifocal lens. Various lenses having various characteristics such as a lens having a plurality of areas, which differ in a transmission wavelength band, can be used. Further, a normal lens can also be used as the imaging lens 10. In this case, the fact that a modulation transfer function (MTF) differs depending on a position of the lens may be used, to acquire images having different MTF characteristics, respectively, in the circular area at the center and the annular area on the outer side thereof. Color filters in different colors, respectively, in the circular area at the center and the annular area on the outer side thereof may be added to the imaging lens 10, to acquire images in different colors in the circular area at the center and the annular area on the outer side thereof. While the image sensor also has two different directional characteristics because the imaging lens is divided into two areas in the first to third embodiments, the image sensor needs to have three types of different directional characteristics if the imaging lens is divided into three or more areas.

While the presently disclosed subject matter has been described with reference to the embodiments, it is to be understood that the technical scope of the presently disclosed subject matter is not limited to the scope described in the above embodiments. It is apparent to those skilled in the art that various alterations or improvements can be added to the above embodiments. It is apparent from the description of the claims that the altered or improved embodiments can also be included in the technical scope of the presently disclosed subject matter. The presently disclosed subject matter is not particularly limited to an imaging apparatus capable of imaging a plurality of images that differ in characteristics but is also applicable to a single-lens stereoscopic imaging apparatus, which captures a stereoscopic image using one optical system by pupil division, and a phase difference focus detection apparatus.

It should be noted that processes such as operations, procedures, steps, and stages in an apparatus, a system, a program, and a method illustrated in the claims, the specification, and the drawings can be implemented in any order as long as the execution order of the processes is not particularly specified as "before" and "prior to" and an output of the current process is not used for the subsequent process. This does not necessarily mean that it is essential to implement the processes in this order even if an operation flow in the claims, the specification, and the drawings has been described using "first" and "then" for convenience.

What is claimed is:

1. An imaging apparatus comprising:
an imaging optical system;
an image sensor having a plurality of light receiving elements two-dimensionally arranged therein;
a light shielding member disposed between the imaging optical system and the image sensor, the light shielding member configured to make only a light flux, which has passed through a predetermined area of the imaging optical system, incident on a first light receiving element which is a part of the plurality of light receiving elements; and
an image generation device configured to generate an image of a subject from an imaging signal of the first light receiving element,
wherein the light shielding member is a plate-shaped member having a first light shielding material formed to correspond to the first light receiving element and formed to shield a light flux, which has passed through an area other than the predetermined area, formed therein,
wherein the imaging optical system includes a first area having a first characteristic and a second area having a second characteristic different from the first characteristic, the second area being wider than the first area,
only the light flux, which has passed through the first area, is incident on the first light receiving element by the light shielding member,
light fluxes, which have respectively passed through the first area and the second area, are incident on a second light receiving element other than the first light receiving element, the image generation device generates an image of the subject from an imaging signal of the second light receiving element, and the imaging apparatus includes an image processing unit configured to perform at least one of blur correction processing, contrast correction processing, and interpolation processing of embedding a missing pixel when the image of the subject is generated from the imaging signal of the second light receiving element.

2. An imaging apparatus comprising:

an imaging optical system;

an image sensor having a plurality of light receiving elements two-dimensionally arranged therein;

a light shielding member disposed between the imaging optical system and the image sensor, the light shielding member configured to make only a light flux, which has passed through a predetermined area of the imaging optical system, incident on a first light receiving element which is a part of the plurality of light receiving elements; and an image generation device configured to generate an image of a subject from an imaging signal of the first light receiving element, wherein the light shielding member is a plate-shaped member having a first light shielding material formed to correspond to the first light receiving element and formed to shield a light flux, which has passed through an area other than the predetermined area, formed therein, wherein the imaging optical system includes a first area having a first characteristic and a second area having a second characteristic different from the first characteristic, the second area being wider than the first area, the light shielding member has a second light shielding material formed to correspond to the second light receiving element which is a light receiving element other than the first light receiving element and formed so that only a light flux, which has passed through the second area passes therethrough formed therein, and the image generation device generates an image of the subject from an imaging signal of the second light receiving element.

3. The imaging apparatus according to claim 1,
wherein the light shielding member is a transparent glass plate having the first light shielding material formed on a surface of the light shielding member by etching.

4. The imaging apparatus according to claim 2,
wherein the light shielding member is a transparent glass plate having the first light shielding material formed on a surface of the light shielding member by etching.

5. The imaging apparatus according to claim 1,
wherein the light shielding member is fixed to a position spaced by a predetermined distance apart from the image sensor.

6. The imaging apparatus according to claim 2,
wherein the light shielding member is fixed to a position spaced by a predetermined distance apart from the image sensor.

7. The imaging apparatus according to claim 1,
wherein the light shielding member is disposed to be movable in parallel along a surface perpendicular to an optical axis.

8. The imaging apparatus according to claim 2,
wherein the light shielding member is disposed to be movable in parallel along a surface perpendicular to an optical axis.

9. The imaging apparatus according to claim 1,
wherein the light shielding member is formed so that a ratio occupied by the first area in the imaging optical system and a ratio occupied by the first light receiving element in the plurality of light receiving elements become substantially equal to each other.

10. The imaging apparatus according to claim 2,
wherein the light shielding member is formed so that a ratio occupied by the first area in the imaging optical system and a ratio occupied by the first light receiving element in the plurality of light receiving elements become substantially equal to each other.

11. The imaging apparatus according to claim 1,
wherein the imaging optical system includes a circular area, a planar shape of the circular area is circle, the circular area being arranged at a center of the imaging optical system, and an annular area arranged at an outer edge of the circular area, the circular area is the second area, and the annular area is the first area.

12. The imaging apparatus according to claim 2,
wherein the imaging optical system includes a circular area, a planar shape of the circular area is circle, the circular area being arranged at a center of the imaging optical system, and an annular area arranged at an outer edge of the circular area, the circular area is the second area, and the annular area is the first area.

13. The imaging apparatus according to claim 1,
wherein the imaging optical system is a multifocal lens including a first area having a first focal length as the first characteristic and a second area having a longer focal length than the first focal length as the second characteristic.

14. The imaging apparatus according to claim 2,
wherein the imaging optical system is a multifocal lens including a first area having a first focal length as the first characteristic and a second area having a longer focal length than the first focal length as the second characteristic.

* * * * *